Dec. 23, 1952     B. J. FERRO, JR     2,622,935
SOLID CATALYST INJECTION APPARATUS
Filed Oct. 27, 1947
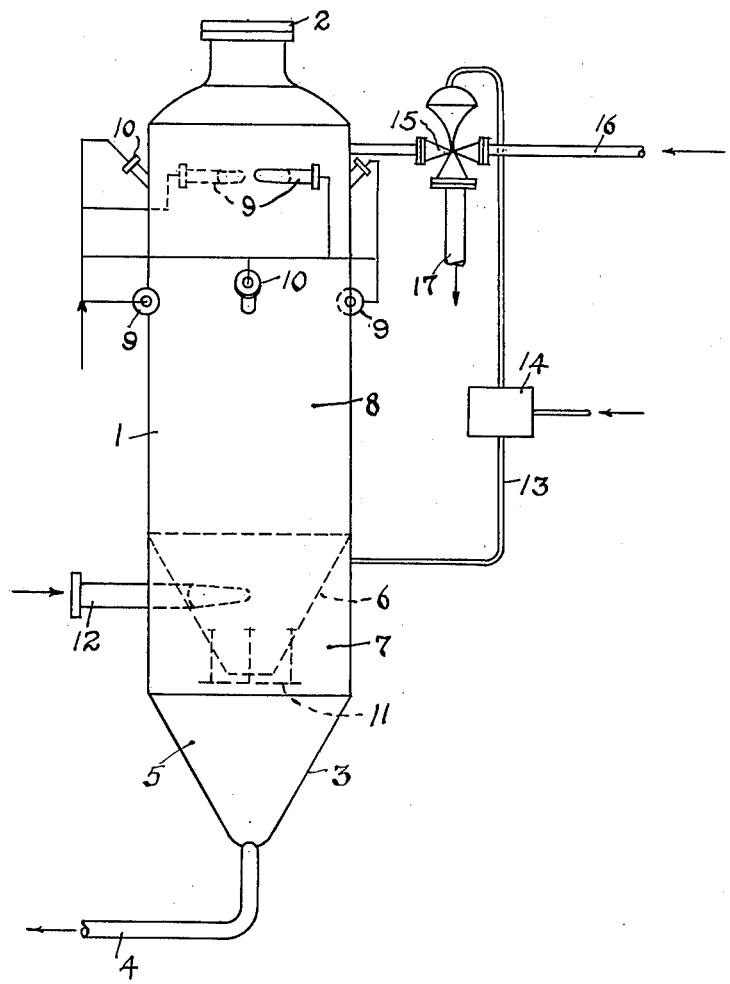
INVENTOR.
Bernardo J. Ferro, Jr.
BY Darby & Darby
Att'ys.

Patented Dec. 23, 1952

2,622,935

UNITED STATES PATENT OFFICE 2,622,935

SOLID CATALYST INJECTION APPARATUS

Bernardo J. Ferro, Jr., Bartlesville, Okla., assignor to Phillips Petroleum Company, a corporation of Delaware Application October 27, 1947, Serial No. 782,239

6 Claims. (Cl. 302—15)

This invention is for a novel apparatus and method by means of which solid catalyst of the Friedel-Crafts type are introduced into a reaction zone.

An object of this invention is to provide an apparatus and method of this type for introducing finely divided aluminum halide and particularly aluminum chloride as a catalyst to a reaction zone in suspension in one of the reactants.

In various hydrocarbon conversion processes such as isomerization and alkylation and specifically in the alkylation of isobutane with ethylene to produce diisopropyl alkylate the catalyst used is known as an aluminum chloride-hydrocarbon complex. In the patent art this type of catalyst is sometimes referred to as a complex type catalyst and at other times it is called a sludge type catalyst. An aluminum chloride-hydrocarbon catalyst is formed by reacting aluminum chloride with a relatively heavy hydrocarbon fraction such as kerosene or heavy alkylate. The resulting complex is a reddish black comparatively viscous liquid and as such is not considered an active alkylation catalyst. Most experts agree that the complex formed as described above will act as a solvent for additional aluminum chloride which is actually the active component of the catalyst. During the operation of such an alkylation process the catalyst in the reaction zone gradually loses its activity because the free aluminum chloride which is dissolved, suspended or absorbed in the hydrocarbon complex gradually becomes expended. Therefore, to maintain operation it is necessary to continuously withdraw a small portion of the catalyst from the reaction zone for the purpose of reactivation or refortification by the addition of finely divided aluminum chloride. Withdrawing this stream of catalyst from a high pressure reaction zone to a zone of approximately atmospheric pressure and the addition of finely divided granular aluminum chloride thereto, has in the past presented serious difficulties. In fact, this part of the operation, that is catalyst refortification, has in many cases proven to be the most difficult phase of the entire operation. From this it is apparent that the actual catalyst in a diisopropyl alkylation process is the aluminum chloride-hydrocarbon complex to which has been added granular, finely divided aluminum chloride.

A general object of this invention is to avoid the above mentioned difficulties. In accordance therewith, the finely divided aluminum chloride is suspended in a moving stream of one of the reactants for the process and introduced therewith into the reaction zone.

A further object of this invention is to provide a novel apparatus and method for the reactivation or refortification of aluminum chloride-hydrocarbon complex catalysts, without withdrawing a portion of the catalyst from the reaction zone.

In accordance with this invention, refortification of the catalyst is effected by passing all of one of the reactants such as isobutane or a controlled portion thereof through the apparatus herein disclosed for the purpose of suspending in it a controlled amount of granular aluminum chloride. The mixture is then delivered to the reaction zone. The catalyst phase in the reaction zone dissolves or absorbs the aluminum chloride from the reactant isobutane and thus the catalyst within the reaction zone is reactivated or refortified. It will be understood that for the best operation of this disclosed method it is essential that substantially no reaction occur between the reactant isobutane stream and the aluminum chloride.

As the disclosure proceeds it will be understood that the disclosed method and apparatus is not limited to aluminum chloride and isobutane because it may be used with the same advantages with other aluminum halides such as aluminum bromide and other hydrocarbon reactants, the only limitation on the hydrocarbon stream being that it must be substantially unreactive with the aluminum halide. Broadly speaking, the disclosed method and apparatus may be used in any catalytic hydrocarbon process such as alkylation, isomerization, disproportionation and the like wherein it is necessary to add a controlled amount of finely divided solid catalysts to the reaction zone either continuously or intermittently.

In the alkylation of isobutane and ethylene to form a diisopropyl alkylate, it is common to use as the catalyst finely divided aluminum chloride in the form of a hydrocarbon complex or sludge. In the reaction zone there is formed two liquid phases, a heavy lower phase containing the aluminum chloride in a hydrocarbon complex of unknown structure, and an upper phase comprised of supernatent hydrocarbons.

Most of the prior art methods of introducing the catalyst into the reaction zone have disadvantages which it is sought here to overcome and which need not be detailed because they are very well known to those skilled in the art.

An object of this invention is to provide an apparatus and method by means of which an isobutane stream, for example, is introduced in a tangential direction to a confined space in such a manner as to withdraw from the bottom of a superposed body thereof the solid catalyst in suitable quantity for incorporation and suspension in the isobutane. The isobutane containing the suspended catalyst is then fed directly to the reaction zone.

Other and more detailed objects of the invention will be apparent from the following description of the method and apparatus represented by the embodiment in the attached drawings.

This invention resides substantially in the combination, construction, arrangement and relative location of parts, steps, and series of steps, all as will be described in detail below.

In the accompanying drawing the single figure is a diagrammatic view in elevation of a container for finely divided catalyst and associated elements by means of which the objects of this invention are accomplished.

As illustrated, the apparatus includes a vessel 1 of suitable size and preferably of circular cross-section having any suitable form of removable closure at the top through which the finely divided catalyst may be introduced thereinto. The bottom of the container is in the form of an inverted cone 3, provided with an outlet 4 through which the isobutane stream with suspended catalyst passes to the reaction zone, not shown.

The conical bottom 3 forms a space 5 of similar shape below the lower end of a conical hopper 6 open at the top and bottom and having an imperforate wall. The upper peripherial edge of the hopper forms a fluidtight seal with the wall of the container 1. The hopper 6 and lower portion of the container 1 form an annular compartment 7 just above the compartment 5 formed by the conical bottom 3.

The space above the hopper 6 to the top of the container 1 is in the form of a cylindrical space 8. The cylindrical space 8 is provided with a series of nozzles 9 arranged to discharge a fluid tangentially thereinto. It is also provided with a series of vertically inclined nozzles 10 for discharging the same fluid downwardly into the space 8.

Supported from the hopper 6 so as to be spaced from the lower or discharge end thereof is an imperforate plate 11 forming means for limiting the rate at which the solid catalyst escapes through the bottom of the hopper and preventing it falling freely into the chamber 5 and thereby filling it.

The space 7 is provided with a tangentially arranged supply nozzle 12 through which the stream of isobutane is introduced in a tangential direction into that chamber to cause it to swirl around the discharge end of the hopper 6.

The space 7 is connected by means of a pipe 13 through a pressure control regulator 14 to a pressure fluid operated motor valve 15. The valve 15 is a three-way valve and is connected in the pressurizing gas line 16 so as to control the supply of pressurizing gas to the space 8. The other port of the valve is provided with a line 17 for venting the pressure gas from this space under certain operating conditions.

The finely divided aluminum chloride is for example charged into the space 8 so as to fill it. The container is then sealed by the supply closure 2. Of course, any well known method of introducing the catalyst into the chamber continuously, if desired, may be employed. As a result of this the hopper 6 is also filled, but the plate 11 normally prevents it from escaping into the space 5. A stream of isobutane is delivered through the inlet nozzle 12 circumferentially into the space 7 and its centrifugal-rotational flow therein causes the finely divided aluminum chloride to be sucked from the discharge end of the hopper 6 at a controlled rate, as determined by the distance which the plate 11 is spaced from the free end of the hopper. The suction action tends to throw the finely divided catalyst to the outer wall of the space 7 where it is picked up by the whirling body of isobutane and carried therein in suspension through the outlet 4 to the reaction vessel.

These operations occur with the space 8 brought up to a suitable pressure, as for example a pressure of 400 pounds per square inch. The pressure in the spaces 5 and 7 is maintained substantially equal to the pressure in the space 8 or a little lower than the pressure therein by means of the pressure control device 14 which is subject to the pressure in the spaces 5 and 7 by reason of the pipe connection 13 thereto. The controller 14 in turn controls the supply and exhaust of pressure fluid to the motor valve 15 so that upon proper adjustment the suitable pressurizing gas in introduced through the line 16 into the space 8 to maintain it at the same or slightly higher pressure than is maintained in spaces 5 and 7. A gas suitable for pressurizing is one that is inert such as hydrogen, methane, dry nitrogen and the like. Should the pressure in the space 8 become too high the three-way valve 15 will be actuated by the controller 14 to cut off the supply of pressurizing gas through the line 16 and vent it to atmosphere or some other point through the line 17.

The nozzles 9 and 10 and the connections thereto are provided for the purpose of introducing a fluid, preferably the same as that which is fed through nozzle 12, in various directions to dislodge and flush from the walls of the container 1 any of the catalyst which may tend to cling thereto.

From the above description it will be apparent to those skilled in the art that the subject matter of this invention is capable of some variation, and I prefer, therefore, to be limited only as required by the claims granted me.

What is claimed is:

1. The combination comprising a container for a solid finely divided catalyst, a downwardly converging hopper dividing said container into upper and lower spaces and opening at its converging end into said lower space, means spaced from said open converging end for restricting discharge of catalyst from the mouth of said hopper, and means for discharging a liquid tangentially into said lower space to maintain a body of liquid about the mouth of the hopper, and means for withdrawing the carrier stream with catalyst suspended therein from said lower space.

2. In the combination of claim 1, said restricting means comprising a plate supported a predetermined distance from the discharge mouth of said hopper.

3. In the apparatus of claim 1, means for supplying a pressurizing gas to said upper space to create an atmospheric pressure therein at least equal to the pressure in said lower space.

4. In the combination of claim 1, said carrier stream being discharged into said lower space at superatmospheric pressure, and means controlled by the pressure in said lower space for supplying a pressurizing gas to said upper space.

5. In the combination of claim 1, said carrier stream being discharged into said lower space at superatmospheric pressure, and means controlled by changes in the pressure in said lower space for supplying to and exhausting from said upper space a pressurizing gas to maintain a pressure in the upper space at least equal to the pressure in the lower space.

6. In the combination of claim 1, means for supplying a flushing fluid to said upper space to dislodge catalyst clinging to the wall of said container.

BERNARDO J. FERRO, JR.

REFERENCES CITED

The following references are of record in the file of this patent:

UNITED STATES PATENTS

| Number | Name | Date |
| --- | --- | --- |
| 2,430,278 | Daniels | Nov. 4, 1947 |
| 2,441,820 | Jewell | May 18, 1948 |